June 21, 1960  P. R. MALMBERG ET AL  2,941,575
APPARATUS FOR DIELECTRIC FABRICATION
Filed Sept. 14, 1955

INVENTORS
PAUL R. MALMBERG
EDWARD R. FREDERICK
BY
Jas. R. Snyder
ATTORNEY

2,941,575

APPARATUS FOR DIELECTRIC FABRICATION

Paul R. Malmberg, Wilkinsburg, Pa. (403 Hampton Ave., Pittsburgh 21, Pa.), and Edward R. Frederick, 818 Geyer Ave., Pittsburgh, Pa.

Filed Sept. 14, 1955, Ser. No. 534,278

6 Claims. (Cl. 154—42)

This invention relates to a method and means for the dielectric heat sealing of thermoplastic sheets, films, or fabrics or plies of sheets or films or fabrics.

This invention depends upon the well-known principle that heat is generated within a dielectric material when it is interposed in a radio frequency field. In sealing thermoplastic materials by this technique, adjacent plies of such material are bonded or caused to flow together in a seal at the area subjected to such a field, which is set up between electrodes which are coupled to a source of high frequency oscillations. This heating principle is rather common and has been applied to the bonding of wood, rubber, synthetic resins and other materials.

In the ordinary dielectric sealing practice with bar type equipment, bonding of thermoplastic plies is accomplished by placing the plies on a metal plate, often made of brass, which serves as a lower electrode. An upper electrode, consisting of an accurately machined metal bar, which may be either straight or shaped to the contour of the desired seam, is then brought down edgewise on top of the thermoplastic plies by means of a press. A high frequency voltage applied across the two electrodes causes heating within the thermoplastic material due to dielectric losses therein, and the resulting seal at the adjacent faces of the plies is a positive weld junction of the plies.

In a more recently devised technique, an electrical insulation sheet is placed between the thermoplastic plies on the one hand and the base electrode on the other and serves to minimize arcing between the top and base electrodes and, further, permits simultaneous sealing and cutting.

In the previous art, whether involving the use of the top electrode, thermoplastic plies and base electrode, or the top electrode, thermoplastic plies, electrical insulator and base electrode, or other such combinations as now employed, very accurately machined electrodes are required.

Important objects of the invention are to provide a heat sealing method involving apparatus which includes an improved and simplified temperature controlled electrode wherein the physical form of the latter lends itself readily to temperature control at any required temperature with all the attendant advantages deriving from such temperature control, and which embodies an electrode design of vastly superior ease of manufacture whereby the need of close dimensional tolerances in electrode fabrication is eliminated.

Further objects and advantages of the invention are to provide a heat sealing method and means which will extend the utility of heat sealing methods employing a non-sealable electrical insulation between the sealing electrodes, and which makes practicable the fabrication by dielectric sealing of certain types of materials; for example, structures made from very thin thermoplastic material, which previously could not be made economically because of the need for extreme dimensional tolerances in the electrodes.

Still further objects of the invention are to provide an apparatus which is simple in its construction and arrangement, durable and efficient in its use, positive in its action, and comparatively economical in its manufacture, operation, and maintenance.

In the accompanying drawings forming a part of this specification,

This disclosure does not attempt to include a description of apparatus for moving either or both of the electrodes relative to each other since any convenient means may be used for accomplishing their movements. It is preferred, however, to employ a power-operated press mechanism for this purpose so as to provide sufficient pressure for the resilient pad to function properly.

Similarly only a schematic diagram of the radio frequency oscillator and of the electrodes has been indicated. It is to be understood that the electrodes may be coupled in any desired manner to a radio frequency oscillator, with suitable control circuits for controlling the electric field impressed between the electrodes, as required or desired. The source of temperature controlling fluid is not shown but will normally consist of a fluid reservoir, temperature maintaining means for the reservoir, pump mechanism for forcing the fluid through the tubular electrode, and suitable means for controlling these components.

In the following description, for convenience, the electrodes 12 and 20 are identified as "upper" and "lower" respectively, although other placements of the electrodes may be equally suitable to best meet conditions found in practice. The invention is therefore not limited to the use of the electrodes spaced one above the other.

Figure 1:
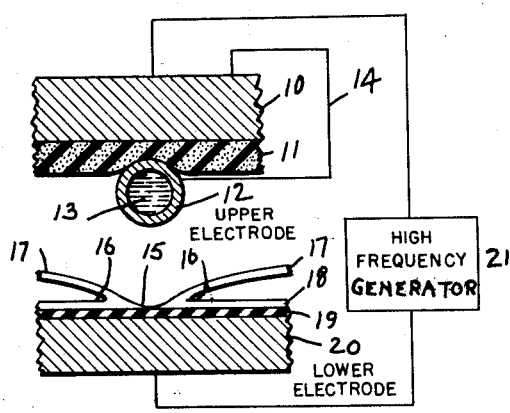
Figure 1 is a schematic view, showing in cross section the sealing electrodes of one form of the apparatus just after a sealing and cutting operation has taken place and with the upper electrode raised, and also showing the electrical circuit.

Figure 1 shows the output of a radio frequency generator 21 connected to the upper press platen 10 and to a press platen lower electrode 20 which are movable with respect to each other in the vertical direction by means of a suitable press mechanism, not shown. A tubular upper electrode 12 is electrically connected to the upper press platen 10 by a conducting strap 14, with a resilient cushioning pad 11 positioned between the upper electrode and the bottom face of the upper press platen. Between the top face of the lower electrode 20 and the material plies 17 and 18 to be sealed is located an electrical insulation sheet 19.

The cushioning pad 11 may be vulcanized natural or synthetic rubber or any other analogous resilient material having proper resistance to the temperatures required in sealing operations. A fluid 13 is pumped through the tubular upper electrode 12. This fluid is thermostatically controlled at a constant temperature and serves to maintain a fixed upper electrode temprature. This fluid may be a liquid such as oil or water, or may be a gas or gas mixture such as air supplied at a fixed temperature and under suitable pressure by suitable auxiliary devices.

It is also generally desirable to maintain the lower electrode 20 at a constant temperature. Because of this electrode's larger free area, this result can usually be accomplished by letting the lower electrode come to equilibrium with the ambient temperature. In other cases, it may be desirable to use additional thermostatic control to maintain the temperature of this electrode substantially constant.

Figure 2:
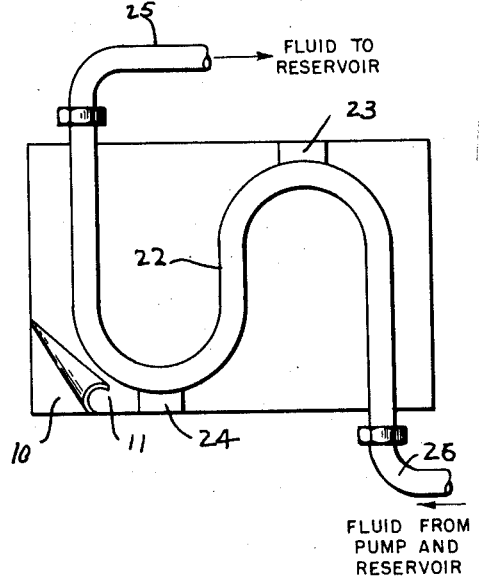
Figure 2 is a schematic bottom plan view showing a complete upper electrode and mounting, and indicating temperature control connections.

Figure 2 illustrates in inverted plan view an upper electrode 22 which has an S-shaped contour, and indicates how such an electrode may be mounted on the resilient pad 11 and upper press platen 10 by means of electrtically conducting straps 23, 24, and connected to a source of temperature controlled fluid by flexible pressure hoses 25 and 26.

Referring again to Figure 1, the upper electrode 12, in addition to applying radio frequency power to the material plies 17 and 18 for sealing, may be caused to penetrate these plies as they soften from the heat generated therein, to produce a tear type seal. The uniformity of the electrode penetration is brought about through the natural adjustment of the somewhat flexible tubular electrode 12 and the leveling tendencies offered by the resilient pad 11 as the two electrodes 12 and 20 are brought together. The inherent flexibility of an annealed copper or aluminum electrode 12 of circular cross-section is adequate for this purpose as long as abrupt irregularities are avoided. The cushioning action of the pad 11 is readily understood from Figure 3 where the electrode 12 has been brought to rest on the insulation sheet 19 and is pressed uniformly along its length against this insulating sheet through the spring-like action of the pad 11 which is deformed correspondingly.

Figure 3:
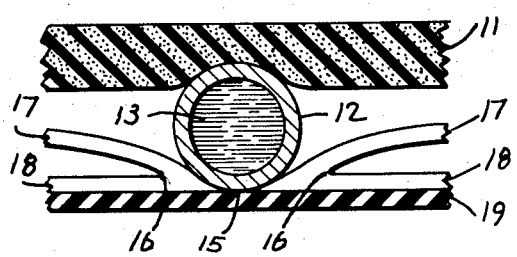
Figure 3 is an enlarged sectional view of the sealing electrode and sealed material just after a sealing and cutting operation has been completed but before the withdrawal of the upper electrode.

The provision of insulation sheet 19 permits penetration of the material plies 17 and 18 with cutting through of these sealable plies at the area 15 in the same operation that effects the sealing (see Fig. 3). As the upper electrode 12, with the cushioning pad 11 above it, is brought down by the press platen 10 onto the insulation sheet 19, a counter pressure is transmitted through the sealable plies 17 and 18 to the cushioning pad 11. Since moderate irregularities in the surfaces of the electrodes 12 and 20 are overcome by the cushioning pad's resiliency, a continuous and even seal and penetration of the plies by the electrode 12 is accomplished throughout the length of this electrode.

In the completed seal, shown in Figure 1, the break or extremely thin film area 15 remaining at the seam in the sealed film area has resulted from essentially complete penetration of the plies 17 and 18 by the curved surface of the electrode 12, and the sealed areas 16 have been formed adjacent to this severance area.

The cushioning pad 11 and the insulation sheet 19 must each possess certain electrical and physical characteristics. Chief requirement for the insulation sheet is high dielectric strength at high and very high radio frequencies. Both the cushioning pad and the insulation sheet must be chemically and physically stable at moderately high temperatures. Electrical characteristics of secondary importance for the insulation sheet include high dielectric constant and low power factor. The insulation sheet must possess a smooth surface and uniform thickness, while the cushioning pad must be reasonably plain surfaced and have suitable resiliency.

The cushioning pad 11 not only serves as a resilient leveling cushion for the electrode 12 but also thermally insulates the electrode 12 from the surface of the press platen 10, so that upper electrode temperature may not be influenced by that of the press platen but only by the temeprature of the circulating fluid 13. The insulation sheet 19 may be made of a material having either low or high thermal conductivity: its choice is determined by the sealing problem at hand.

In sealing together two or more material plies, it is highly desirable to have the outer surfaces of the material plies kept below their melting point by appropriate thermal contact with the electrodes, which are maintained at a suitable temperature.

If the various parameters of the heat energy input, electrode temperature, thermal conduction of the insulation sheet, and time duration of the sealing operation are optimally adjusted to the numbere of plies, melting point and thickness of the plies to be sealed, the area where the highest temperature is reached will include the areas between the theremoplastic plies where the seal is desired, and hence will result in an optimal seal. By suitable choice of insulation sheet 19, temperature of upper electrode 12 and of lower electrode 20, arrived at experimentally, optimal seals can be made under completely reproducible conditions.

Thus it will be seen that temperature control of the two electrodes helps attain complete control of the characeristics of a particular seal. In addition, it renders practicable many seals that could not be easily done otherwise, such as optimal sealing of thin plies to thick plies, optimal sealing of very thin material plies which would be difficult to seal using cold electrodes, and optimal sealing of material plies which are ordinarily difficult to seal because of their low dielectric losses, low dielectric strength, or high thermal conductivity.

If a severance seal such as is shown in Figure 3 is desired, use of an insulation sheet 19 having low thermal conductivity will prevent the lower electrode 20 from cooling the sealable material, thereby allowing the materieal to reach a higher temperature more readily. Thus too, the lower electrode 20 may be held at a somewhat lower temperature, thereby cooling the material more quickly after completion of the seam so as to allow earlier removal of the product from the sealing device.

Figure 4:
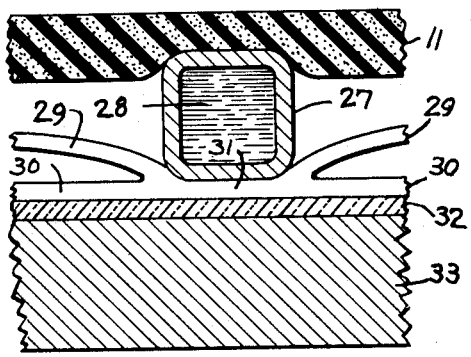
Figure 4 is a view similar to Figure 3 illustrating a modified form of the upper electrode.

An instance wherein an insulation sheet possessing high thermal conductivity, such as porcelain enamel, can be used to advantage is illustrated in Figure 4, which discloses a modified system of dielectrtic heat sealing by electrodes.

This arrangement comprises the cushioning pad 11, an upper electrode 27 conveying the temperature controlled fluid 28, an insulation sheet 32, and a lower electrode 33, and serves to seal the thermoplastic material plies 29 and 30 without cutting through the latter. The electrodes 27 and 33 are held at a temperature appreciably below the melting point of the material plies, and contact the plies 29 and 30 with the relatively cold surfaces of the upper electrode 27 and insulation sheet 32 respectively. This serves to maintain the contacted portions of the plastic material plies in a non-softened state during the dielectric heating process, so that complete penetration of the material plies 29 and 30 cannot be attained, and only the seal 31 will result.

The electrical insulation sheet 32 should be of a material such as porcelain which possesses high thermal conductivity, so that during the sealing operation the outer surfaces of the lower ply 30 may remain sufficiently cool to prevent softening. Use of the porcelain insulation sheet for dielectric sealing applications such as this has not been feasible in the past due to the difficulty of meeting the close dimensional tolerances required. Now, however, the use of the cushioned electrode of this invention overcomes this limitation and makes available the excellent dielectric properties of porcelain, including its high dielectric strength, high dielectric constant, and low dielectric losses, for use in this industry.

The tubular upper electrodes, shown in Figures 1, 2 and 3, have a circular cross section, while that illustrated in Figure 4 has a square cross section with rounded corners. The tubular electrodes of this invention are not restricted to those having particular cross sectional shapes, but may include a large variety of cross sectional shapes that best meet conditions found in practice for various sealing and cutting applications. Production of such assorted shapes is practicable today in extrusion processes for various metals, especially aluminum.

In the use of the invention to seal together two plies of 0.006 inch thick Vinylite, optimal seals were obtained by using an electrode system as shown in Figure 1, wherein the cushioning pad 11 was made of ¼ inch thick solid neoprene gum with a low filler content, the upper electrode 12 was formed of 3/16 inch outside diameter soft copper tubing having a ⅛ inch bore, and the electrical insulation sheet 19 consisted of 0.020 inch fabric laminated Micarta or Formica. The fluid 13 was a low viscosity oil maintained at 80 degrees C. Radio frequency power of 27 megacycles per second was applied by a standard generator 21. The cut seals obtained under these conditions were equal or superior to the best seals that could be produced with these materials using conventional electrodes.

In this description, the various operating parameters have not been specified because of the variety and range of the factors involved, some of which are dependent on the type of machine being used, the kind of material being fabricated and the nature of the seal pattern. Furthermore, several of the electrical parameters may be measured only by a skilled electronics technician using costly and complex equipment and therefore may not be measurable by the ordinary user of dielectric equipment. Since the variables involved are all interrelated, adjustment of the controllable conditions must be determined on the job by a person skilled in the art in order to produce a satisfactory seal. Some factors which influence the quality of the seal are: the electrical, physical and thermal properties of the material being fabricated; the electrical, physical and thermal properties of the cushioning pad; the electrical, physical and thermal properties of the insulation sheet; the sealing area, shape and temperature of the electrode; the voltage, current, frequency and phase angle of the output of the high frequency generator; the time of duration during which the high frequency voltage is applied to the electrodes; the force exerted by the press platens, and many other factors of secondary importance.

From the foregoing description taken in connection with the accompanying drawings, the construction and method of operation of the invention will be readily apparent to those skilled in the art to which the invention appertains, and while the invention has been described in detail with respect to a present preferred embodiment thereof it is not limited to such details and forms since many changes and modifications may be made without departing from the spirit and scope of the invention in its broadest aspects. Hence it is desired to cover any and all forms and modifications which may come within the language or scope of any one or more of the appended claims.

What is claimed is:

1. An apparatus for the high frequency welding of plies of dielectric thermoplastic materials comprising, in combination, an electrode assembly consisting of two platens movable relative to each other; a tubular electrode of the desired seal contour carried by one platen; a resilient cushioning pad interposed between said tubular electrode and the platen which carries it and being of the necessary thickness and resiliency to compensate for irregularities in the evenness of the platens and electrode; means for connecting said electrode with a source of radio frequency power; a thin electrical insulating layer attached to the other platen on the face opposed to the first named platen; and means for connecting said other platen to the source of radio frequency power; said tubular electrode being positioned so as to have direct contact with the dielectric thermoplastic material to be welded and being pressed against said material by relative approaching movement of said platens and acting to weld plies of said material when energized by said source of radio frequency power.

2. The invention defined in claim 1, wherein the tubular electrode has a fluid passageway through it end to end and has its ends connected respectively to a source of fluid under pressure whose temperature during the welding cycle is constantly automatically controlled, and to a discharge point for such fluid.

3. The invention defined in claim 2, wherein the tubular electrode is of circular cross section and has its ends connected by flexible pressure hoses with said source of fluid and said discharge point.

4. The invention defined in claim 2, wherein the tubular electrode is of generally square cross section with a flat side presented toward the opposed platen face.

5. The invention defined in claim 1, wherein the cushioning pad is made of ¼ inch thick solid neoprene gum with a low filler content; one electrode is formed from a 3/16 inch outside diameter soft copper tubing having a ⅛ inch bore, the electrical insulation sheet is 0.020 inch fabric laminate selected from the group consisting of "Micarta" and "Formica," the fluid is a low viscosity oil maintained at 80° C., and the radio frequency power is 27 megacycles per second.

6. The invention defined in claim 1, wherein the thin electrical insulating layer is a sheet of porcelain having high thermal conductivity, high dielectric strength, a high dielectric constant, and low dielectric losses.

References Cited in the file of this patent

UNITED STATES PATENTS

| | | |
|---|---|---|
| 2,388,824 | Brown | Nov. 13, 1945 |
| 2,525,355 | Hoyler | Oct. 10, 1950 |
| 2,617,752 | Von Hauteville | Nov. 11, 1952 |
| 2,638,963 | Frederick | May 19, 1953 |
| 2,657,298 | Andrus | Oct. 27, 1953 |
| 2,667,437 | Zonbek | Jan. 26, 1954 |
| 2,706,233 | Yamaguchi | Apr. 12, 1955 |
| 2,785,729 | Smith et al. | Mar. 19, 1957 |

FOREIGN PATENTS

| | | |
|---|---|---|
| 632,690 | Great Britain | Nov. 28, 1949 |
| 639,614 | Great Britain | July 5, 1950 |